United States Patent [19]
Iga et al.

[11] Patent Number: 5,156,246
[45] Date of Patent: Oct. 20, 1992

[54] ONE-WAY CLUTCH

[75] Inventors: Kazuo Iga, Yamatotakada; Jin Ito, Fussa, both of Japan

[73] Assignee: Koyo Seiko Company, Ltd., Osaka, Japan

[21] Appl. No.: 873,606

[22] Filed: Apr. 22, 1992

Related U.S. Application Data

[63] Continuation of Ser. No. 661,197, Feb. 27, 1991, abandoned.

[30] Foreign Application Priority Data

Jul. 13, 1990 [JP] Japan .................. 2-74909[U]

[51] Int. Cl.⁵ ........................................... F16D 3/34
[52] U.S. Cl. ................................... 192/45; 192/41 R; 188/82.84
[58] Field of Search ............... 192/45, 44, 41 A; 188/82.84; 267/158, 163, 164

[56] References Cited

U.S. PATENT DOCUMENTS

| | | | |
|---|---|---|---|
| 3,184,020 | 5/1965 | Benson et al. | 192/45 |
| 3,404,760 | 10/1968 | Benson et al. | 192/45 |
| 3,500,977 | 3/1970 | Gehrke | 192/45 |
| 3,537,555 | 11/1970 | Herzpgenaurach et al. | 192/45 |
| 3,761,206 | 9/1973 | Fierstine | 192/45 X |
| 3,863,742 | 2/1975 | Elmore et al. | 192/45 |
| 3,885,544 | 5/1975 | Pfeiffer | 192/45 X |
| 3,998,507 | 12/1976 | Tune | 192/45 X |
| 4,566,567 | 1/1986 | Miyatake | 192/45 |
| 4,720,001 | 1/1988 | Jensen | 192/45 X |
| 5,007,514 | 4/1991 | Hattori et al. | 192/45 |

FOREIGN PATENT DOCUMENTS 2-43532   3/1990   Japan .

*Primary Examiner*—Leslie A. Braun
*Assistant Examiner*—Andrea Pitts
*Attorney, Agent, or Firm*—Mason, Fenwick & Lawrence

[57] ABSTRACT

A one-way clutch comprises a plurality of rollers, a retainer having the same number of roller pockets as rollers, a cylindrical shell having the same number of cam grooves as rollers, and springs for normally biasing the rollers toward the cam grooves. The cam grooves are provided at the axially intermediate portion of the shell. The shell is provided at one end with a radially inwardly-turned flange and at the other end with a cylindrical boss portion having a smooth inner surface free of cam grooves. The retainer includes a pair of annular portions at either end and an axially intermediate portion provided with roller pockets. The annular portion which is inserted into the boss portion of the shell has a smooth cylindrical outer surface dimensioned to be pressingly fitted to the boss portion. Thus there are no gaps between the retainer and the shell at the boss portion of the shell, thereby sealing that end of the shell and preventing the outflow of grease and the entry of dust.

1 Claim, 6 Drawing Sheets

ONE-WAY CLUTCH

This application is a continuation of U.S. patent application Ser. No. 07/661,197, filed Feb. 27, 1991, abandoned.

BACKGROUND OF THE INVENTION

1. Field of the Invention

The present invention relates to a one-way clutch of the shell type.

2. Description of the Prior Art

There is known a one-way clutch of the type above-mentioned disclosed by, for example, U.S. Pat. No. 3,863,742 in which the retainer includes longitudinally (axially) spaced rims (40, 42), one or more resilient spring bars (44) for interconnecting the rims and rollers (38) disposed in pockets formed by the resilient spring bars, the retainer being fitted to a case (32) provided on the inner peripheral surface thereof with ramps (34) and stops (36). The resilient spring bars operate to retain the rollers in the retainer and to resiliently bias the rollers in one direction. Tabs (48, 50) engage the stops of the case.

There is also known a one-way clutch of the type above-mentioned disclosed by U.S. Pat. No. 3,537,555 which comprises: an outer ring (1) provided on the inner peripheral surface thereof with camming gripping surfaces (2); a cage (4) made, by bending both sides thereof, in the form of a groove having an U-shaped cross section at the bottom of which openings (5) are formed, a plurality of projections (4a', 4b') being formed at the both side flanges or end rings (4a, 4b) of the groove, the cage (4) being engaged with the gripping surfaces (2) formed on the inner peripheral surface of the outer ring (1); and a strip (6) sticked to the reverse side of the cage and including a connecting piece (9) having tongue-like spring elements (8) and openings (7) identical with the openings of the cage.

As the retainer of a one-way clutch of the type above-mentioned, there is known a retainer disclosed by U.S. Pat. No. 3,500,977 in which rings (14, 15) spaced at regular intervals are connected together by a plurality of cross bars (16), which form pockets (17) in which rollers (13) are housed, each cross bar (16) being provided at both ends and the center thereof with lugs (18, 20), the lugs at the both ends having arcuate surfaces which follow the arcuate surfaces of the rollers, an oval spring (12) being engaged with each center lug.

There is also known a one-way clutch of the type above-mentioned which is disclosed by U.S. Pat. No. 3,404,760 or 3,184,020.

Also, there is known a one-way clutch of the type above-mentioned as shown in FIGS. 8 to 10, for example. This one-way clutch comprises a plurality of rollers 30, a retainer 32 having roller pockets 31 in the same number as that of the rollers 30, a shell 34 having cam grooves 33 in the same number as that of the rollers 30, and springs (not shown) for biasing the rollers 30 toward the cam grooves 33.

This one-way clutch is made by the steps of radially inwardly bending one open end of a case body to prepare an unfinished shell 34 having a radially inwardly turned flange 34A, putting the rollers 30, the springs and the retainer 32 in the shell 34 through the open end thereof, and radially inwardly bending the open end of the shell 34. Thus, the one-way clutch is arranged such that the retainer 32 and other component elements do not come off from the shell 34. The cam grooves 33 are formed substantially throughout the axial length of the shell 34, and gaps D are formed, as shown in FIGS. 9 and 10, between the inner peripheral surfaces of the cam grooves 33 and the outer peripheral surfaces of the annular portions at the axial ends of the retainer 32. Accordingly, grease in the spaces where the rollers are present, may leak outside through the gaps D. In this connection, both ends of the shell 34 are radially bent to close the gaps D, thereby to prevent the leakage of grease.

There is also known a one-way clutch as shown in FIG. 11. This one-way clutch is different from the one-way clutch shown in FIGS. 8 to 10 in that one end of the shell 34 is not bent but remains opened axially straight. The open end of the shell 34 is adapted to be closed by a radially inwardly turned flange 35A provided at the inner part of the housing space of a housing 35 on which the one-way clutch is mounted.

In the one-way clutch shown in FIGS. 8 to 10, there is required a bending operation for radially inwardly bending one open end of the unfinished shell 34. If the shell 34 is one cured by heat treatment, it is difficult to bend the open end thereof. Thus, the working efficiency is low to disadvantageously increase the production cost.

In the one-way clutch shown in FIG. 11, before the component elements housed inside of the shell 34 are assembled with the housing 35, the component elements might come off, thus presenting inconvenience to handling before the clutch is assembled with the housing 35.

As a retainer to overcome the problems above-mentioned, there is known a retainer disclosed by Japanese Utility Model Laid-Open Publication No. 43532/1990 or 110724/1990. In this retainer (2, 1), one annular portion (21, 3) is provided on the circumference thereof with projections (25, 31) at regular spatial intervals, the other annular portion (22, 2) is provided with a convex engagement portion (5, 21), and V-shape elastic pieces (24, 6) are disposed for pushing, in one direction, rollers disposed in roller pockets (20, 5) from column portions (23, 4).

SUMMARY OF THE INVENTION

In view of the foregoing, the present invention is proposed to provide an economical one-way clutch improved in sealing properties, which can be readily assembled.

It is a main object of the present invention to provide a one-way clutch comprising a plurality of rollers, a retainer having pockets in the same number as that of the rollers, a cylindrical shell having cam grooves in the same number as that of the rollers, and springs for biasing the rollers toward the cam grooves. In the one-way clutch, the shell is provided at the axially intermediate portion thereof with the cam grooves. The shell is also provided at one sides of the cam grooves thereof with a radially inwardly turned flange and at the other sides of the cam grooves thereof with a cylindrical boss portion having no cam grooves.

It is another object of the present invention to provide a one-way clutch in which the retainer is provided at the axially intermediate portion thereof with roller pockets at both ends of which annular portions are respectively disposed, the outer peripheral cylindrical surface of the annular portion 22 at the rear side in the assembling direction having such shape and sizes as to be pressingly fitted to the cylindrical boss portion of the shell.

In the one-way clutch having the arrangement above-mentioned, the cam grooves are not formed throughout the axial length of the shell. By pressingly fitting that annular portion of the retainer at the rear side in the assembling direction to the cylindrical boss portion disposed at the other sides of the cam grooves, one side of the shell is sealed. More specifically, no gaps are formed between the shell and the retainer, assuring the sealing properties of the one-way clutch. This securely prevents the leakage of grease inside of the one-way clutch, as well as the entry of outside dust. Further, the one-way clutch may be readily assembled by mounting the retainer on the shell. This eliminates troublesome labor of machining the shell or utilizing other members as conventionally required.

BRIEF OF THE DRAWINGS

DESCRIPTION PREFERRED EMBODIMENT

Figure 1:
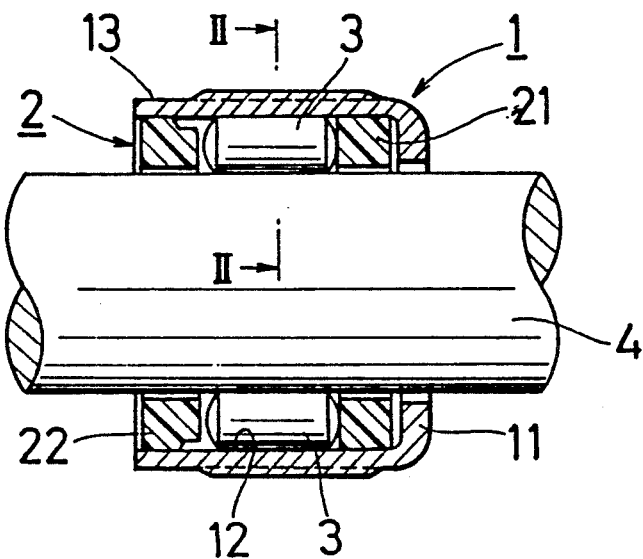
FIG. 1 is an axial section view of a one-way clutch in accordance with the present invention which is under use.

The following description will discuss a preferred embodiment of the present invention with reference to the attached drawings.

A specific example of the present invention is shown in FIGS. 1 to 7, in which a one-way clutch has a shell 1, a retainer 2 and rollers 3, and a rotary shaft is generally designated by a reference numeral 4.

Figure 3:
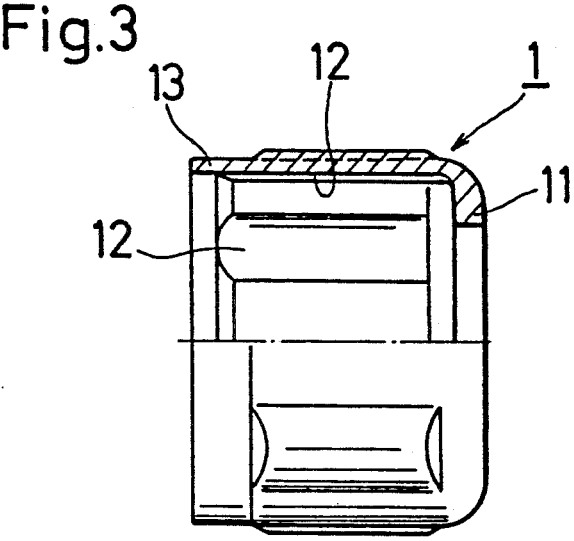
FIG. 3 is a side view, with upper portions shown in section, of the shell of the one-way clutch of the present invention.

As shown in FIG. 3, the shell 1 is formed by a case body which has one axial end in the form of a radially inwardly turned flange 11, and the other axial end opened axially straight. The shell 1 is provided at the axially intermediate portion thereof with cam grooves 12 in the same number as that of the rollers 3.

Disposed at the open end of the shell 1 is a cylindrical boss portion 13 having a perfect roundness with no cam grooves or the like, the cylindrical boss portion 13 having an inner diameter substantially equal to the diameter of a circle tangent to the cam grooves 12.

Figure 4:
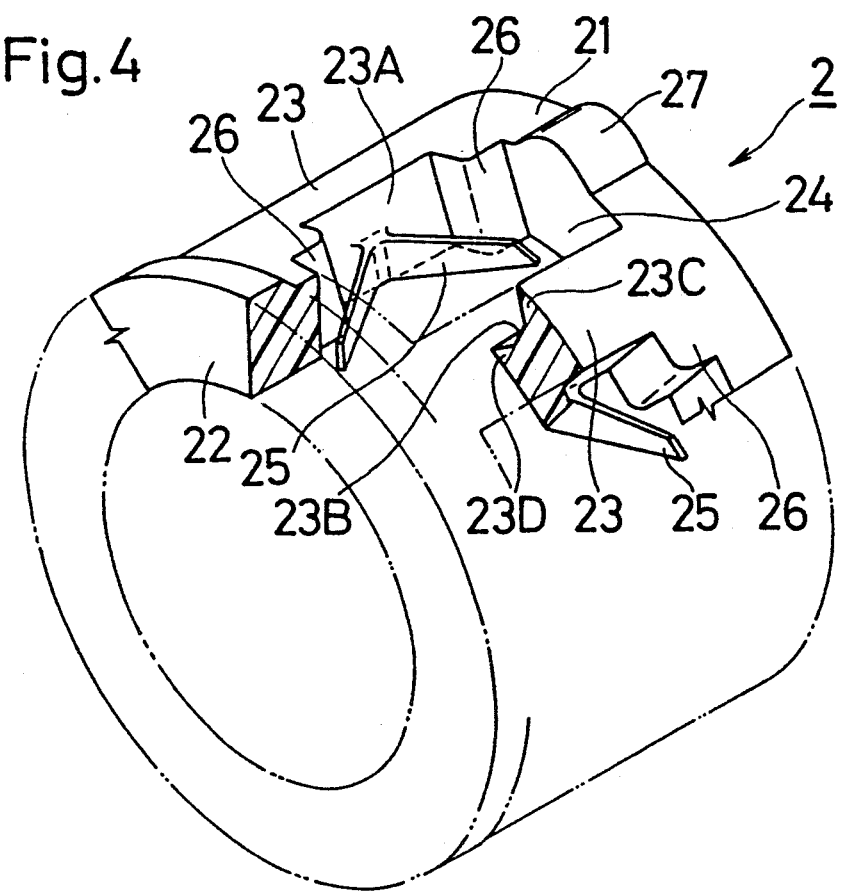
FIG. 4 is a perspective view, with portions shown in section, of the retainer of the one-way clutch of the present invention.

As shown in FIG. 4, the retainer 2 made of synthetic resin is provided at both axial ends thereof with two annular portions 21, 22, respectively, which are opposite to each other. The retainer 2 also has a plurality of column portions 23 interconnecting the annular portions 21, 22, the column portions 23 being spaced at equal intervals in the circumferential direction of the annular portions 21, 22. Each space defined between adjacent column portions 23 serves as a roller pocket 24 for housing a roller.

The rear wall 23B of each column portion 23 has an inner projecting part 23C and an outer projecting part 23D which project toward the front wall 23A of the adjacent column portion 23 and which extend along the entire length of each roller pocket 24. The cross section of each of the projecting parts 23C, 23D is nearly triangular.

Figure 2:
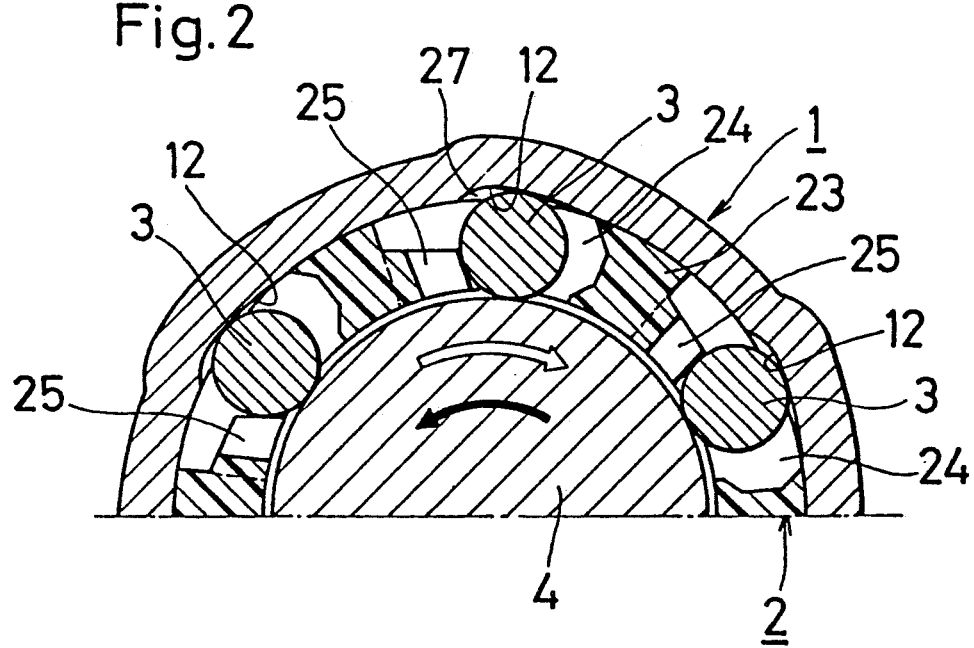
FIG. 2 is an enlarged section view taken along the line II—II in FIG. 1.

Each column portion 23 integrally has, at the front wall 23A thereof, a spring 25 made of a fork-like elastic piece substantially in the form of a V-shape in plan elevation, the spring 25 extending, as flaring, toward the rear wall 23B of the adjacent column portion 23. Stops 26 are disposed at both lateral sides of the proximal end of each spring 25. The wall of each column portion 23 at the clockwise side in FIG. 2 or 4, is referred to as the front wall thereof, while the wall of each column portion 23 at the counterclockwise side in FIG. 2 or 4 is referred to as the rear wall thereof.

The stops 26 are disposed at the back sides of the free ends of each spring 25 and adapted to limit the elastic deformation of the spring 25 when the same is rearwardly bent. In the stops 26, the ridge portions with which the springs 25 are adapted to come in contact, are roundly chamfered. Accordingly, when the springs 25 come in contact with the ridge portions, the stress caused in the springs 25 is reduced.

In the retainer 2, the annular portion 21 at the tip side in the assembling direction is provided on the outer periphery thereof with three projections 27 which are spaced at equal intervals in the circumferential direction. The annular portion 22 at the rear side in the assembling direction has an outer diameter greater than the diameter of a circle circumscribed about the outer peripheries of the column portions 23. 23, and the outer peripheral surface of the annular portion 22 is made in the form of a cylindrical surface. Each projection 27 is substantially semicircular in section. Each projection 27 is engaged with every other cam groove 12 of the shell 1. The entire cylindrical surface of the annular portion 22 is pressingly fitted to the cylindrical boss portion 13 of the shell 1.

The following description will discuss how to assemble the one-way clutch of the present invention.

Figure 5:
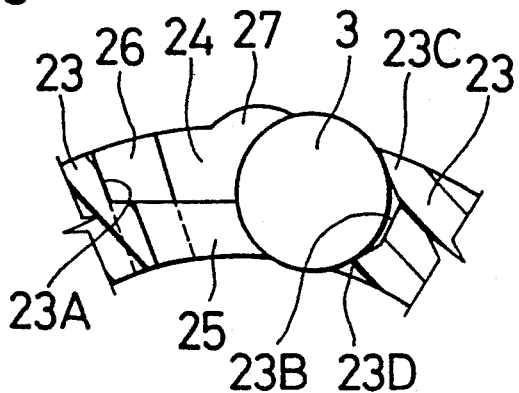
FIG. 5 is a partial section view illustrating how rollers are held in the retainer of the one-way clutch of the present invention.

The rollers 3 are put in the roller pockets 24 of the retainer 2 from the radial outside. As shown in FIG. 5, when the rollers 3 are put in the roller pockets 24, the springs 25 are resiliently bent slightly rearwardly. By the resilient repulsion caused bu such a bent, the rollers 3 are pushed and biased toward the rear sides of the column portions 23 and held by the projecting parts 23C, 23D. This prevents the rollers 3 from radially inwardly or outwardly coming off from the roller pockets 24.

With each projection 27 of the annular portion 21 at the tip side in the assembling direction facing every other cam groove 12 of the shell 1, the retainer 2 is pushed in the shell 1 through the open end thereof. Thus, each projection 27 of the annular portion 21 at the tip side in the assembling direction is engaged with every other cam groove 12 of the shell 1, so that the retainer 2 is immovably held with respect to the shell 1. At the same time, the entire cylindrical surface of the annular portion 22 of the retainer 2 at the rear side in the assembling direction is pressingly fitted to the cylindrical boss portion 13 of the shell 1. Thus, the retainer 2 is so held as not to be axially separated from the shell 1.

The one-way clutch thus assembled is adapted to be mounted on the rotary shaft 4 with the rollers 3 coming in contact with the outer peripheral surface of the shaft 4.

In the one-way clutch having the arrangement above-mentioned, the annular portion 22 of the retainer 2 at the rear side in the assembling direction is pressingly fitted to the cylindrical boss portion 13 of the shell 1, so that no gaps are formed between the shell 1 and the retainer 2, as conventionally done. However, at the annular portion 21 of the retainer 2 at the tip side in the assembling direction, there are formed gaps between the portions having no projections 27 and the cam grooves 12 of the shell 1. Such gaps are closed by the flange 11 of the shell 1, as conventionally done.

The following description will discuss the operation of the one-way clutch of the present invention as mounted on the rotary shaft 4.

When the rotary shaft 4 is rotated clockwise in FIG. 2 (in the direction shown by a white arrow), the resilient resetting forces of the springs 25 are applied to the rollers 3, causing the same to be rotated toward the loosely inclined surface sides of the cam grooves 12. Thus, the rollers 3 are wedged between the cam grooves 12 and the rotary shaft 4. Accordingly, the rollers 3 cannot be rotated so that the rotary shaft 4 and the shell 1 may be integrally rotated.

On the contrary, when the rotary shaft 4 is rotated counterclockwise in FIG. 2 (in the direction shown by a black arrow), the rollers 3 are rotated toward the sharply inclined surface sides of the cam grooves 12, while causing the springs 25 to be rearwardly bent. Accordingly, the rollers 3 are freely rotatable between the cam grooves 12 and the rotary shaft 4, so that only the rotary shaft 4 is rotated while the shell 1 is not rotated.

Figure 6:
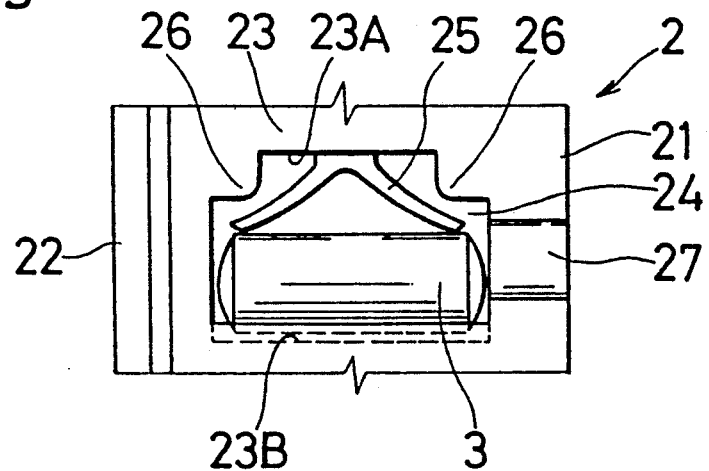
FIG. 6 is a plan view of FIG. 5.
Figure 7:
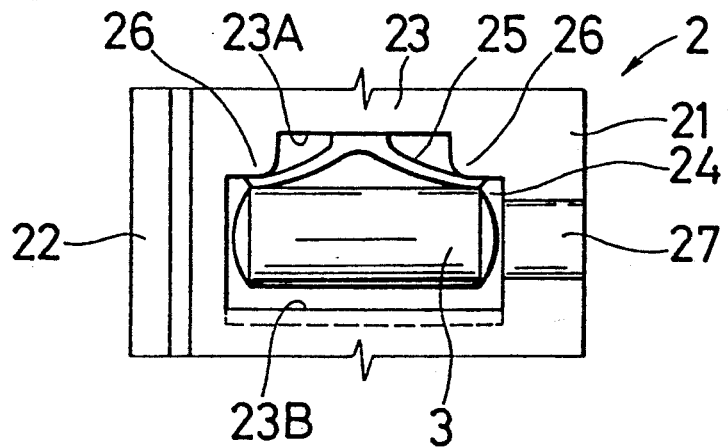
FIG. 7 is a view similar to FIG. 6, but illustrates a spring in the one-way clutch which is in a free state.
Figure 8:
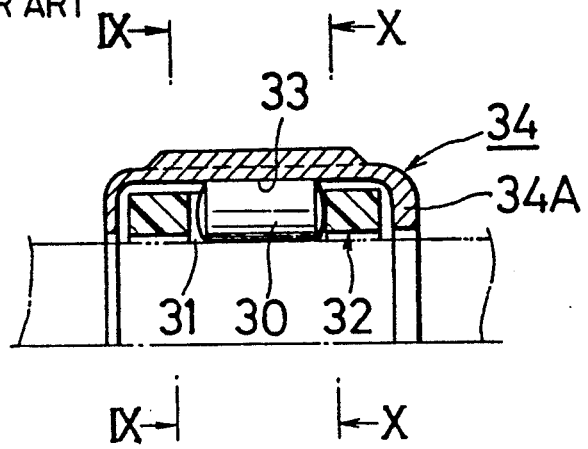
FIG. 8 is an axial section view of a conventional one-way clutch which is under use.
Figure 9:
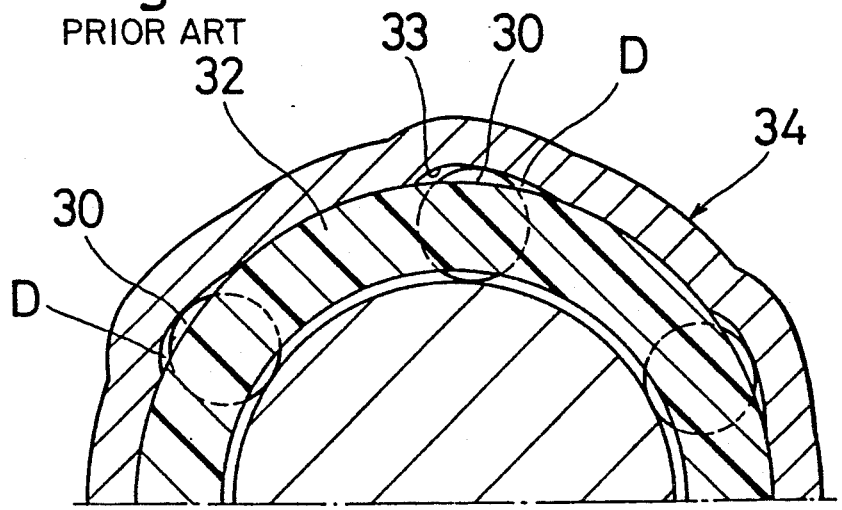
FIG. 9 is an enlarged section view taken along the line IX—IX in FIG. 8.
Figure 10:
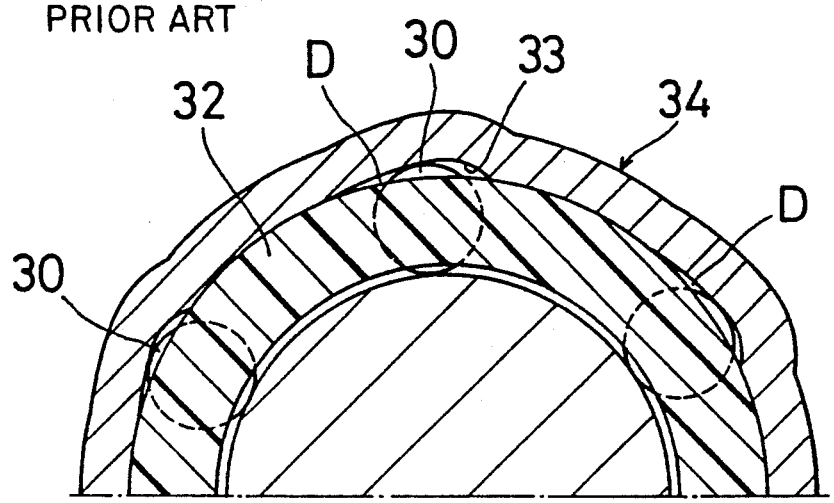
FIG. 10 is an enlarged section view taken along the line X—X in FIG. 8.
Figure 11:
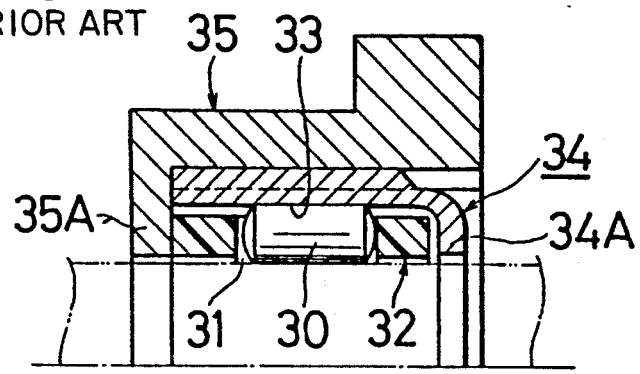
FIG. 11 is an axial section view of another conventional one-way clutch which is under use.
Figure 12:
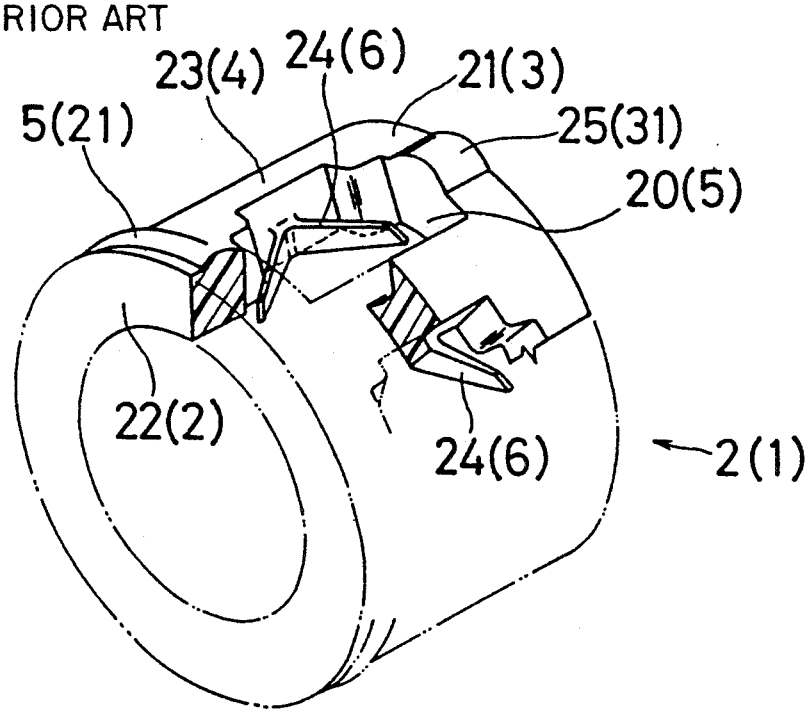
FIG. 12 a perspective view of a retainer previously invented by the Inventor.

When the rollers 3 are freely rotated, the springs 25 are changed in state from the position shown in FIG. 6 to the position shown in FIG. 7 where the springs 25 are received by the stops 26 disposed at the front walls 23A of the rearward column portions 23. Accordingly, the amounts of rearward deformation of the springs 25 are restricted. Further, the springs 25 are tapered in the direction toward the free ends thereof and made of the same synthetic resin as that of the retainer 2. When the springs 25 come in contact with the rollers 3, the free ends of the springs 25 contact, in a linear or planar manner, with the rollers 3, so that the surface pressures are lowered. This lowers the stress of the springs 25. Accordingly, even though the engagement and disengagement of the one-way clutch are frequently repeated, the springs 25 are prevented, for a long period of time, from being permanently deformed.

Since the retainer 2 is simple in minute structure, molding dies for producing the retainer are made more readily than conventional ones. Further, the molding dies may be removed with less prudence than conventionally done. Accordingly, rationalization in production and facilities may be realized.

Thus, the retainer 2 used in the present invention may be readily produced, yet assuring the performance thereof. In the embodiment above-mentioned, the springs 25 have been formed integrally with the retainer 2. However, the present invention may be applied to a conventional arrangement of the general type in which the springs and the retainer are separated from each other.

As described in the foregoing, that portion of the retainer 2 which is pressingly fitted to the shell 1, may be securely sealed with a simple operation of pressingly fitting one annular portion of the retainer 2 to the open end of the shell 1. Thus, as compared with a conventional one-way clutch to be sealed by bending one end of the shell, the present invention is superior in that no post-treatment is required and the assembling operation is simplified. As compared with a conventional one-way clutch to be sealed with the use of a counter-member on which the one-way clutch is mounted, the present invention is superior in that the handling during transportation is convenient.

According to the present invention, there may be provided an economical and simple one-way clutch excellent in sealing properties, which is easy to set up.

What is claimed is:

1. A one-way clutch comprising:
   a plurality of rollers;
   a retainer made of a synthetic resin and having a first end and a second end, said retainer including first and second annular portions at said first and second ends, respectively, and a plurality of column portions disposed between and interconnecting said first and second annular portions, said annular portions and said column portions defining a plurality of roller pockets for holding said rollers, said annular portions having outer peripheral surfaces, said outer peripheral surface of said first annular portion having a smooth cylindrical surface and said outer peripheral surface of said second annular portion having a plurality of axially-extending projections thereon;
   a cylindrical shell disposed around said retainer, said shell having first and second axial ends respectively adjacent said first and second ends of said retainer, an intermediate portion intermediate said first and second ends, and an inner peripheral surface, said shell at said first axial end being open and provided with a cylindrical boss portion, said shell at said second axial end being provided with a radially inwardly-turned flange, said inner peripheral surface at said intermediate portion and said second end having a plurality of axially-extending cam grooves formed therein, said cam grooves engaging with said projections, said cam grooves being equal in number to said rollers, and said inner peripheral surface at said boss portion being cylindrical and smooth with no circumferential or cam grooves formed therein; and
   spring means for normally biasing said rollers towards said cam grooves;
   wherein said outer peripheral surface of said first annular portion has a diameter slightly larger than said inner peripheral surface of said boss portion, enabling said outer peripheral surface of said first annular portion to be press fitted to said boss portion of said shell; and
   all of said outer peripheral surface of said first annular portion is press fitted to said inner peripheral surface of said shell at said boss portion.

* * * * *